United States Patent
Kohiyama et al.

(10) Patent No.: US 12,219,086 B2
(45) Date of Patent: Feb. 4, 2025

(54) COMMUNICATION MODULE, COMMUNICATION SYSTEM, AND COMMUNICATION METHOD

(71) Applicant: Hitachi Industrial Equipment Systems Co., Ltd., Tokyo (JP)

(72) Inventors: Tomohisa Kohiyama, Tokyo (JP); Takayoshi Fujioka, Tokyo (JP); Naoya Tobisawa, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 411 days.

(21) Appl. No.: 17/784,716

(22) PCT Filed: Dec. 13, 2019

(86) PCT No.: PCT/JP2019/049066
§ 371 (c)(1),
(2) Date: Jun. 13, 2022

(87) PCT Pub. No.: WO2021/117251
PCT Pub. Date: Jun. 17, 2021

(65) Prior Publication Data
US 2023/0021036 A1    Jan. 19, 2023

(51) Int. Cl.
*H04M 15/00*    (2024.01)
*H04L 41/0823*    (2022.01)
(Continued)

(52) U.S. Cl.
CPC ........ *H04M 15/58* (2013.01); *H04L 41/0823* (2013.01); *H04L 67/34* (2013.01)

(58) Field of Classification Search
CPC ...... H04M 15/58; H04M 15/66; H04M 15/60; H04M 15/61; H04M 15/64; H04M 15/65; H04L 41/0823; H04L 67/34
See application file for complete search history.

(56) References Cited

U.S. PATENT DOCUMENTS

2015/0347114 A1* 12/2015 Yoon ............... H04L 12/2832
                                                    717/176
2015/0350879 A1   12/2015 Li et al.
(Continued)

FOREIGN PATENT DOCUMENTS

CN    106604269 A    4/2017
JP    2003-242415 A    8/2003
(Continued)

OTHER PUBLICATIONS

IP.com Search (Year: 2024).*
(Continued)

*Primary Examiner* — Moustapha Diaby
(74) *Attorney, Agent, or Firm* — Crowell & Moring LLP

(57) ABSTRACT

A communication module includes a plurality of communication interfaces that support a plurality of different types of communication interface standards to implement a general-purpose communication module that enables data communication not depending on types of equipment. A plurality of programs to be executed in the communication module include a first app to be executed on an OS (Operating System) and one or a plurality of second apps to be executed on the OS. Each of one or more second apps is an app that performs communication in accordance with one or more types of communication protocol on one or more communication interface standards and is an app that can be arbitrarily installed and arbitrarily uninstalled. The first app is an app as middleware between the OS and the one or the plurality of second apps.

20 Claims, 8 Drawing Sheets

(51) Int. Cl.
*H04L 67/00* (2022.01)
*H04M 17/00* (2024.01)
*H04W 4/24* (2024.01)

(56) References Cited

U.S. PATENT DOCUMENTS

| | | | |
|---|---|---|---|
| 2018/0032368 A1* | 2/2018 | Choi | G06F 9/48 |
| 2019/0102214 A1 | 4/2019 | Kondo et al. | |
| 2019/0137980 A1* | 5/2019 | Prakash | H04L 41/085 |
| 2019/0220264 A1* | 7/2019 | Yoon | G06F 8/61 |

FOREIGN PATENT DOCUMENTS

| | | | |
|---|---|---|---|
| JP | 2005-223788 A | 8/2005 | |
| JP | 2016-29791 A | 3/2016 | |
| JP | 2017-138895 A | 8/2017 | |
| JP | 2019-66985 A | 4/2019 | |

OTHER PUBLICATIONS

ProQuest search (Year: 2024).*

Chinese-language Office Action issued in Chinese Application No. 201980102858.X dated May 31, 2023 with English translation (13 pages).

International Search Report (PCT/ISA/210) issued in PCT Application No. PCT/JP2019/049066 dated Mar. 3, 2020 with English translation (four (4) pages).

Japanese-language Written Opinion (PCT/ISA/237) issued in PCT Application No. PCT/JP2019/049066 dated Mar. 3, 2020 with (three (3) pages).

Japanese-language Notice of Reasons of Cancellation issued in Japanese Application No. 2020-517599 dated Jun. 28, 2021 with English translation (41 pages).

Japanese-language Office Action issued in Japanese Application No. 2020-133292 dated Nov. 2, 2021 with English translation (eight (8) pages).

Ito A. et al., "IoT-Compatible Industrial Controller with Enhanced Information Processing Functions", Hitachi Hyoron Co., Hitachi Review, Dec. 2017, pp. 62-67, vol. 99, No. 6, retrieved from https://dl.ndl.go.jp/view/download/digidepo_11180780_po_62-67_12A05.pdf?contentNo=I&alternativeNo (seven (7) pages).

Uchikoshi H., "Super-introduction to Docker: Part 1: What is Docker?", IT Media Corporation, Jan. 30, 2017, retrieved from https://www.atmarkit.co.jp/ait/articles/I_701/30/news03_7_.html (four (4) pages).

"IoT-Enabled Industrial Controller PAC System HX Series HF-W/ IoT Series", Hitachi Industrial Systems Ltd, Oct. 2017, (23 pages).

"Hitachi IoT-enabled Industrial Controller HX Series Application Manual (Service Manual) Hybrid Model Edition", Hitachi Industrial Equipment Systems, Ltd., Feb. 2008, NJI-653, (16 pages).

Japanese-language Office Action issued in Japanese Application No. 2020-133292 dated Jul. 26, 2022 with English translation (10 pages).

* cited by examiner

COMMUNICATION MODULE, COMMUNICATION SYSTEM, AND COMMUNICATION METHOD

TECHNICAL FIELD

The present invention generally relates to data communication.

BACKGROUND ART

As a technique related to a communication module, there is, for example, a technique disclosed in Patent Literature 1.

CITATION LIST

Patent Literature

[Patent Literature 1]
Japanese Patent Laid-Open No. 2016-29791

SUMMARY OF INVENTION

Technical Problem

It is an increasingly common practice to perform data collection from various kinds of industrial equipment (such as, for example, a compressor, a motor and an industrial ink-jet printer) like IoT (Internet of things). Each of such various kinds of industrial equipment requires a communication module for data communication (for example, data transmission).

While elements related to the communication module include communication interface standards to be employed in communication and communication protocol to be employed in communication, there are a variety of types of these elements. Examples of the communication interface standards include, for example, RS232C, RS485 and Ethernet (registered trademark). The communication interface standards typically relate to a physical layer. Examples of the communication protocol include, for example, UDP (User Datagram Protocol), MQTT (Message Queuing Telemetry Transport) and Modbus protocol. The communication protocol typically relates to an upper layer compared to a layer to which the communication interface standards belong.

Which communication interface standards and communication protocol are to be employed normally depends on industrial equipment. There are various kinds of industrial equipment. For example, there is a case where even a manufacturer that provides a plurality of types of industrial equipment, that is, a manufacturer that manufactures a single motor and an air compressor that is applied equipment of the motor employs communication interface standards or communication protocol different between the air compressor and the motor, and in a case where the air compressor and the motor are collectively subjected to monitoring, or the like, it is necessary to construct an on-premise monitoring system by providing a cloud monitoring system in which communication conversion apparatuses that respectively support the air compressor and the motor are provided and communication is performed via an IoT gateway or by providing communication conversion apparatuses, which makes it difficult to proceed with IoT at a factory, or the like, due to such communication standards supported for each kind of industrial equipment.

It is therefore desirable to implement a general-purpose communication module that enables data communication not depending on types of industrial equipment.

Such a problem can also arise in equipment other than industrial equipment.

Solution to Problem

A communication module includes a plurality of communication interfaces that support a plurality of different types of communication interface standards. A plurality of programs to be executed at the communication module include a first app to be executed on an OS (Operating System) and one or a plurality of second apps to be executed on the OS. Each of one or more second apps is an app that performs communication in accordance with one or more types of communication protocol on one or more communication interface standards and is an app that is arbitrarily installable and arbitrarily uninstallable. The first app is an app as middleware between the OS and the one or the plurality of second apps.

Advantageous Effect of Invention

A general-purpose communication module that enables data communication not depending on types of equipment is implemented.

DESCRIPTION OF EMBODIMENT

Figure 1:
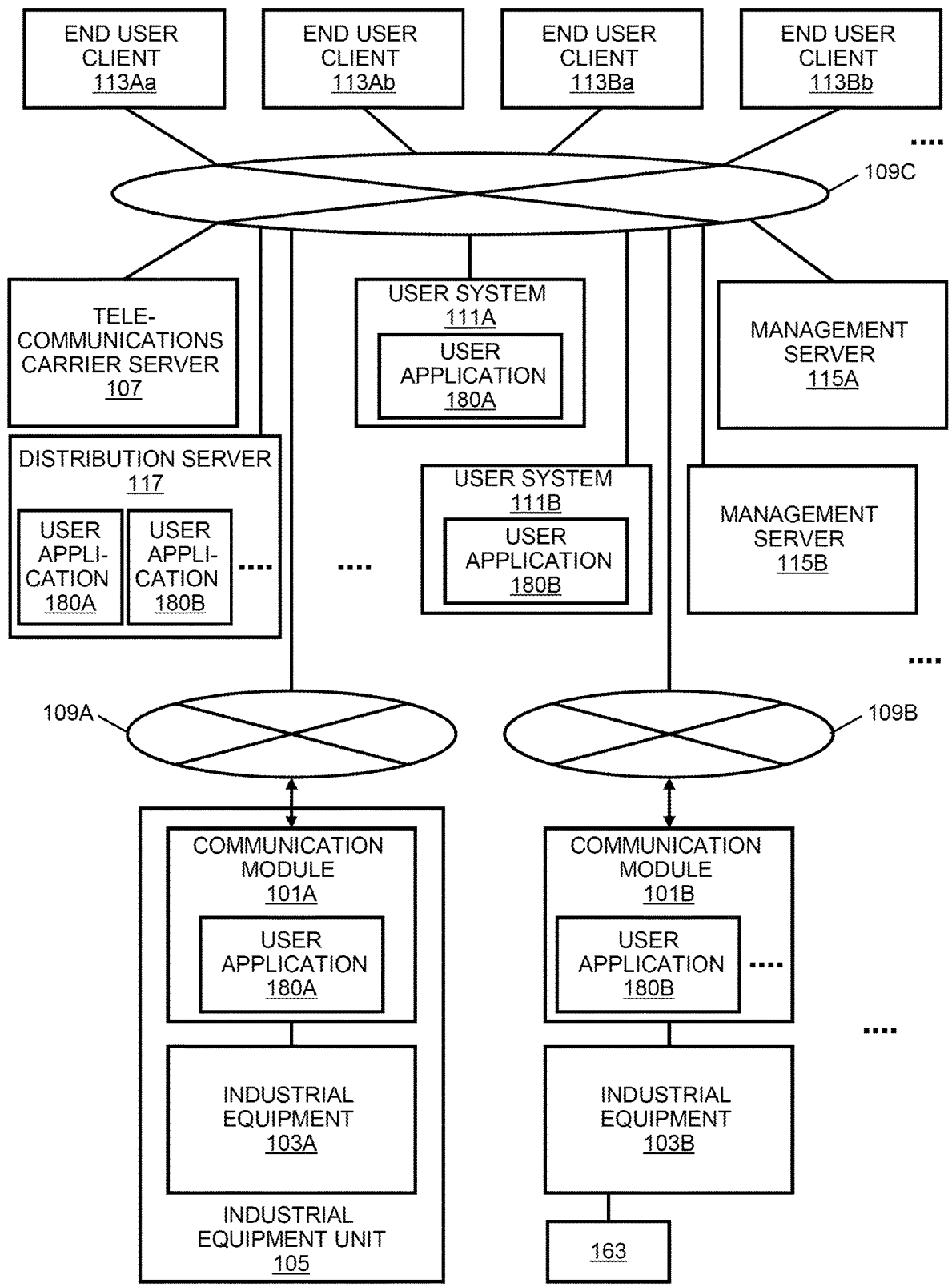
FIG. 1 illustrates a configuration of an entire system according to an embodiment.

In the following description, a "communication interface apparatus" may be one or more communication interface devices. One or more communication interface devices may be one or more communication interface devices of the same type (for example, one or more NICs (Network Interface Cards)) or may be two or more communication interface devices of different types (for example, an NIC and an HBA (Bost Bus Adapter)).

Further, in the following description, a "memory" may be one or more memory devices that are one example of one or more storage devices and may typically be a main storage device. At least one memory device in the memory may be a volatile memory device or may be a non-volatile memory device.

Further, in the following description, a "permanent storage apparatus" may be one or more permanent storage devices that are one example of one or more storage devices. The permanent storage device may typically be a non-volatile storage device (for example, an auxiliary storage device) and specifically, for example, an HDD (Hard Disk Drive), an SSD (Solid State Drive), an NVMe (Non-Volatile Memory Express) drive or an SCM (Storage Class Memory).

Further, in the following description, the "storage apparatus" may be a memory and at least a memory of the permanent storage apparatus.

Further, in the following description, a "processor" may be one or more processor devices. At least one processor device may typically be a micro processor device such as a CPU (Central Processing Unit) or may be other types of processor devices such as a GPU (Graphics Processing Unit). At least one processor device may be a single core or may be a multi-core. At least one processor device may be a processor core. At least one processor device may be a processor device in the broad sense such as a circuit that performs part or all of processing and is an assembly of gate arrays by hardware description language (for example, an FPGA (Field-Programmable Gate Array), a CPLD (Complex Programmable Logic Device) or an ASIC (Application Specific integrated Circuit)).

Further, while in the following description, information for which an output can be obtained with respect to an input will be described using expression of "xxx table", the information may be data having any structure (for example, structured data or unstructured data) or may be a learning model typified by a neural network that generates an output with respect to an input, genetic algorithm or random forest. Thus, "xxx table" can read as "xxx information". Further, in the following description, a configuration of each table is one example, and one table may be divided into two or more tables, or all or part of two or more tables may be one table.

Further, while in the following description, a function will be described using expression of "yyy unit", the function may be implemented by one or more computer programs being executed by a processor or may be implemented by one or more hardware circuits (for example, an FPGA or an ASIC), or may be implemented by a combination thereof. In a case where a function is implemented by a program being executed by a processor, determined processing is performed using a storage apparatus and/or an interface apparatus, or the like, as appropriate, and thus, the function may be made at least part of the processor. Processing described as being performed by a function may be processing to be performed by a processor or an apparatus including the processor. The program may be installed from a program source. The program source may be, for example, a program distribution computer or a computer-readable recording medium (for example, a non-temporary recording medium). Description of each function is one example, and a plurality of functions may be integrated into one function, or one function may be divided into a plurality of functions.

Further, while in the following description, processing will be described as being performed by a "program", the program performs determined processing by being executed by a processor using a storage apparatus and/or an interface apparatus, or the like, as appropriate, and thus, the processing may be described as being performed by the processor (or a device such as a controller including the processor). The program may be installed in an apparatus such as a computer from a program source. The program source may be, for example, a program distribution server or a computer-readable (for example, non-temporary) recording medium. Further, in the following description, two or more programs may be implemented as one program, or one program may be implemented as two or more programs.

Further, in the following description, in a case where elements of the same type are not distinguished from each other, a common reference numeral among reference numerals will be used, and in a case where elements of the same type are distinguished from each other, reference numerals will be used. For example, in a case where communication modules are not distinguished from each other, the communication modules are referred to as a "communication module 101", and in a case where communication modules are distinguished from each other, the communication modules will be referred to as a "communication module 101A" and a "communication module 101B".

One embodiment will be described below. Note that it is assumed that in the following embodiment, the following exist as entities.

Module provider: an entity that provides a communication module (for example, an enterprise)

User: an entity that provides industrial equipment (for example, a manufacturer of the industrial equipment). For example, the user acquires (for example, purchases) a communication module and provides (for example, sells) industrial equipment to which the acquired communication module is coupled.

End user: an entity that uses industrial equipment to which a communication module is coupled (for example, an enterprise having a factory that has a manufacturing line including a plurality of pieces of industrial equipment). Note that the enterprise having a factory that has a manufacturing line is an end user and can also be a user in a case where the enterprise purchases a communication module.

Telecommunications carrier: an entity that manages a predetermined communication network (for example, a mobile phone carrier)

While concerning the embodiment of the present invention, a situation has been described where it is difficult to proceed with IoT due to communication standards supported by industrial equipment, current circumstances regarding IoT will be described. As a background of difficulty in proceeding with IoT, a useful life of industrial equipment is longer than a useful life of household electronic equipment, and thus, communication with a dedicated in-house product is taken into account. Thus, a product for which communication with an edge and a fog layer including an upper layer compared to a layer of industrial equipment is not taken into account is still used today, and thus, there is a case where it is necessary to separately attach a sensor to industrial equipment or provide a communication conversion apparatus that performs conversion after transmitting a predetermined communication command to a communication port dedicated for industrial equipment and receiving a returned status.

In view of such circumstances, IoT industrial equipment is desired in an industrial field in response to social demands such as promotion in efficiency of work and manpower reduction in association with decrease in working population. To solve such a problem, a configuration of an entire system according to the embodiment of the present invention will be described using FIG. 1.

A communication module 101 can play a role as a communication interface apparatus of industrial equipment 103 (one example of equipment). Examples of data to be acquired by the industrial equipment 103 can include, for example, data indicating a status of the industrial equipment 103 and data indicating a measurement value acquired by a sensor of the industrial equipment 103. The data acquired by the industrial equipment 103 is transmitted through the communication module 101.

A relationship between the industrial equipment 103 and the communication module 101 may be a one-to-one relationship, a many-to-one relationship, a one-to-many relationship, or a many-to-many relationship. As will be described later, the communication module 101 is a general-purpose module that does not depend on types of the industrial equipment 103, and thus, typically, the relationship can be a one-to-one relationship or a many-to-one relationship. The one-to-one relationship is a case where a communication module 101B communicates with industrial equipment 103B. Further, the many-to-one relationship is a case where industrial equipment 103A and 103B, other industrial equipment or sensors 163 communicate with the communication module 101B.

The communication module 101 may be provided in various forms. For example, the communication module 101B may be externally attached to the industrial equipment 103E in which the sensors 163 (one or more sensors) are provided, or an industrial equipment unit 105 including the industrial equipment 103A (for example, an industrial equipment body) and the communication module 101A coupled to (for example, incorporated into) the industrial equipment 103A in advance may be provided.

Communication interface standards or communication protocol of the industrial equipment 103A (industrial equipment 103B) are different from communication interface standards or communication protocol for communication via a communication network 109A (communication network 109B). By the communication module 101A (communication module 101B) being coupled to the industrial equipment 103A (industrial equipment 103B), the industrial equipment 103A (industrial equipment 103B) can perform data communication via the communication network 109A (communication network 109B) by way of the communication module 101A (communication module 101B). The communication networks 109A and 109B may be the same communication network or different communication networks. While each of the communication networks 109A and 109B is a wireless communication network (for example, a closed network) in the present embodiment, each of the communication networks 109A and 109B may be a wired communication network or a VPN (Virtual Private Network).

A communication network 109O is coupled to the communication networks 109A and 109B. While the communication network 109O is typically the Internet, the communication network 109C may be other kinds of communication networks. Two or more of the communication networks 109A to 109C may be the same communication network.

A telecommunications carrier server 107, a distribution server 117, a management server 115, a user system 111 (which may be a user server), and an end user client 113 are coupled to the communication network 109C. All of the telecommunications carrier server 107, the distribution server 117, the management server 115, the user system 111 and the end user client 113 may be physical computers or may be virtual systems implemented on a plurality of types of computational resources (for example, a cloud infrastructure).

The telecommunications carrier server 107 is a server of a telecommunications carrier. The telecommunications carrier, for example, manages the communication networks 109A and 109B. The telecommunications carrier server 107 determines a fee in accordance with a communication amount of communication via the communication networks 109A and 109B for each user or for each end user. The determined fee is charged to the user or the end user.

The distribution server 117 is a server that installs an app in the communication module 101. The distribution server 117 may be, for example, a server as a system (for example, an app store) to be managed by an entity other than the end user. The application will be simply referred to as an app as described above.

The management server 115 is a server that manages the communication module 101, determines a fee for use of the communication module 101, specifies and calculates a usage condition of an application to be mounted on the communication module. There may be a plurality of management servers 115A, 115B, . . . corresponding to a plurality of regions. The "region" means a geographical range and may be separated in various units such as country, state, prefecture and city. By separating a communication range and a communication area for each region, data can be managed within a set predetermined region.

The user server 111 is a server of the user. For example, the user server 111 may analyze data corresponding to a predetermined period, which indicates use history of the industrial equipment 103 to be used by the end user and which is transmitted from the communication module 101 coupled to the industrial equipment 103. In this event, the user server 111 can acquire an analysis application from the distribution server 117, and the user system 111 or the management server 115 can measure the number of times of use, a usage period and a usage condition of the acquired analysis application and can specify a compensation with respect to use of the analysis application.

The user can create a user application 180 in the user system 111. The created user application 180 is uploaded to the distribution server 107. The user application 180 desired by the end user can be downloaded from the distribution server 107 to the communication module 101.

By the management server 115 acquiring and managing download information obtained by downloading the user application 180, a compensation for downloading of the user application 180 is specified for the end user of the communication module 101. A compensation based on the number of times of use and a usage condition of the user application 180 as well as based on downloading can be specified. The specified compensation can be collected along with a communication usage fee. Further, the collected compensation is paid to the user of the user system 111 via the telecommunications carrier or an administrator of the distribution server 117 from the telecommunications carrier.

This enables the end user to download an application necessary at the communication module 101 among the applications created by the user in the user system 111. A compensation corresponding to a usage condition and downloading of the application can be collected via the telecommunications carrier, and thus, the end user can make payment along with a communication fee to the telecommunications carrier without directly paying the compensation to the user. Further, the end user does not have to individually pay the compensation to the user and pays the compensation via the telecommunications carrier or the administrator of the distribution server 117, so that a system with improved user-friendliness for the end user can be provided.

The communication module 101 can utilize communication of a mobile telephone network, so that it is possible to implement the above-described specification and collection of the compensation regarding the user application 180.

The end user client 113 only requires to be a computer (for example, a personal computer or a smartphone) to be used by the end user and is a client of the user server 111. In the example illustrated in FIG. 1, clients for the user server 111A of the user A are end user clients 113Aa and 113Ab, and clients for the user server 111B of the user B are end user clients 113Ba and 113Bb.

Information regarding the communication module 101 can be displayed at the end user client 113. Further, in a case where the communication module 101 includes display means, the communication module 101 can be utilized as the end user client 113. An input unit such as a touch panel or input means such as another keyboard can be provided as display means of the end user client 113, and the user application 113 registered in the distribution server 117 can be purchased using the input unit or the input means.

Figure 2:
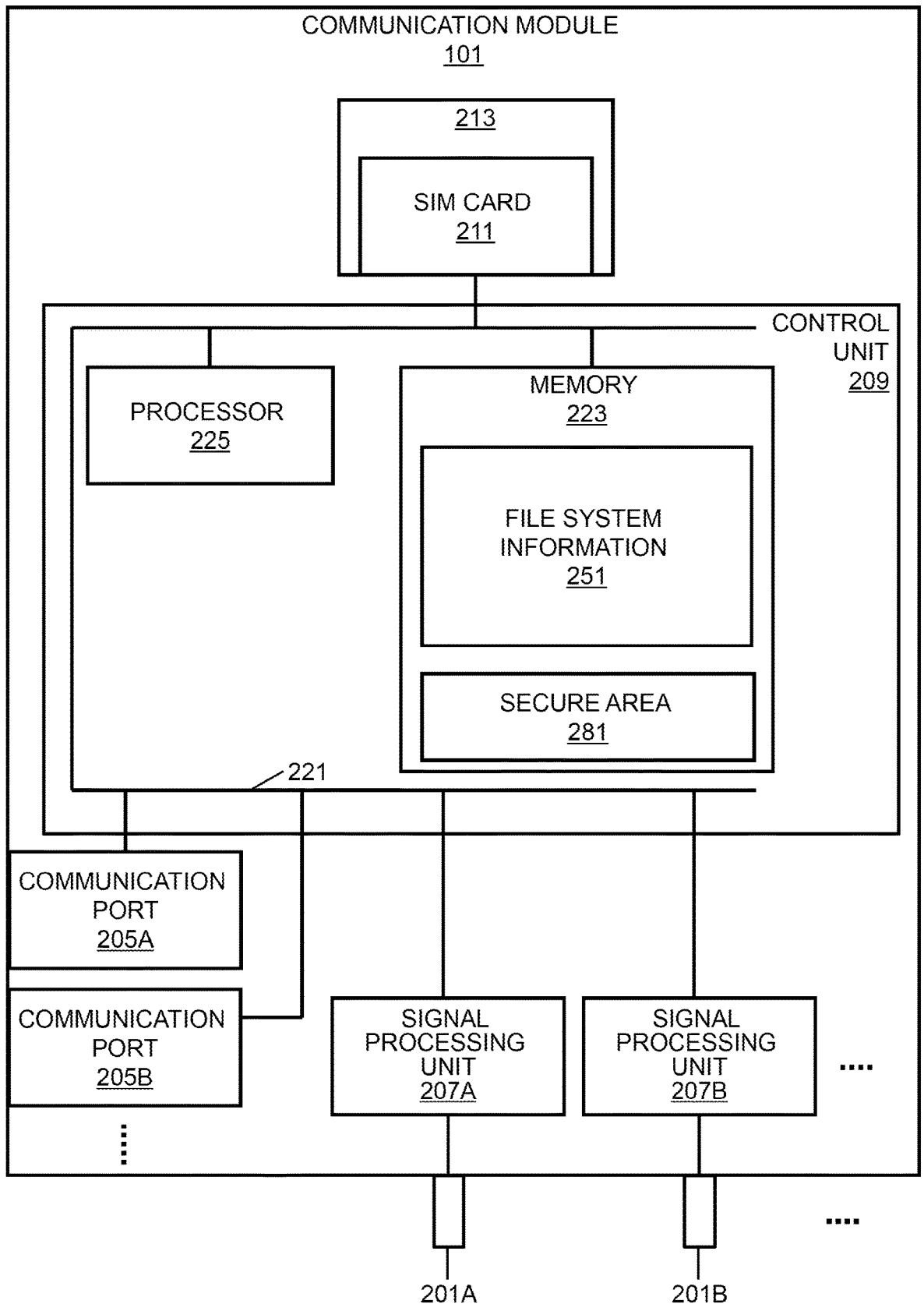
FIG. 2 illustrates a physical configuration of a communication module.

FIG. 2 illustrates a physical configuration of the communication module 101.

The communication module 101 includes a plurality of communication ports 205A, 205B, . . . , and a plurality of antennas 201A, 201B, . . . as one example of a plurality of communication interfaces that support a plurality of different types of communication interface standards. As the communication port 205, for example, an RJ45 port for Ethernet (registered trademark) and EtherCAT (registered trademark), a port for RS232C and a port for RS485 can be employed. In addition, I2C (Inter-Integrated Circuit) and CAN (Controller Area Network) (registered trademark) can be used, which means that embodiment is not limited if the communication standards can be physically used.

One communication port 205 may be used for communication for maintenance such as updating of firmware of the communication module 101. Further, if such a port to be used for communication for maintenance is an independent port different from the communication port 205, the port can be exclusively used for communication, so that safety of a system of the communication module 101 is improved.

Further, as the antenna 201, an antenna for LTE (Long Term Evolution), an antenna for GPS (Global Positioning System) and an antenna for Bluetooth (registered trademark) can be employed. A signal processing unit 207 that processes a signal to be transmitted/received via an antenna 201 may be provided at the communication module 101 for each antenna 201. For example, as illustrated, signal processing units 207A, 207B, respectively corresponding to antennas 201A, 201B, may be provided.

The communication module 101 includes a SIM (Subscriber identity Module) card slot 213. A SIM card 211 in which subscriber identification information is stored is inserted into the slot 213.

Further, the SIM card slot 213 is not limited to a physical slot, and e-SIM (Embedded SIM) can be utilized. In this case, the end user can select a telecommunications carrier appropriate for a region in which the communication module 101 is to be utilized. In conjunction with this, the distribution server 117 can also select whether or not to display or hide a user application appropriate for the region and the telecommunications carrier to the end user.

The present embodiment to which e-SIM is applied can provide a service appropriate for each region, and a usage condition of the user application and a compensation for downloading are collected by way of the telecommunications carrier, so that it is possible to achieve user-friendliness by the service that conforms to laws and regulations for each region. While the SIM card 211 and the SIM card slot 213 will be described below as a representative example, the present invention can be implemented as described above also using the e-SIM.

The communication module 101 includes a control unit 209. The control unit 209 includes a communication interface apparatus 221, a memory 223 and a processor 225 coupled to these. The SIM card 211, each communication port 205 and each signal processing unit 207 are coupled to the interface apparatus 221.

The memory 223 stores file system information 251. The file system information 251 includes directories and files. In the file system information 251, the directories and the files have a relationship of, for example, a tree structure. The file system information 251 includes a structure including an executable file of a program for each of a plurality of programs.

Further, the memory 223 may include a secure area 281. The secure area 281 may store a private key A (corresponding to the private key A out of a pair of keys including a public key A and the private key A in a public key based authentication scheme) of the communication module 101. In a case where the private key A is stored in the secure area 281 in the communication module 101, it is possible to secure that data is transmitted from the communication module 101 by the end user client 113 decrypting the data using the public key A corresponding to the private key A. Further, in a case where the key corresponding to a public key B out of the public key B and a private key B of the end user client 113 in a public key based authentication scheme is stored in the secure area 281 of the communication module 101, it is possible to protect information acquired by the communication module 101 from the industrial equipment 103, or the like, by the user of the end user client 113 managing and using the private key B corresponding to the public key B. Note that in a case where the memory 223 includes the secure area 281, it is preferable to employ a structure in which a bus signal line that couples the processor 225 and the memory 223 is not easily probed by mounting the processor 225 and the memory 223 within the same chip.

The processor 225 executes a plurality of programs (for example, executable files of a plurality of programs) stored in the memory 223.

Figure 3:
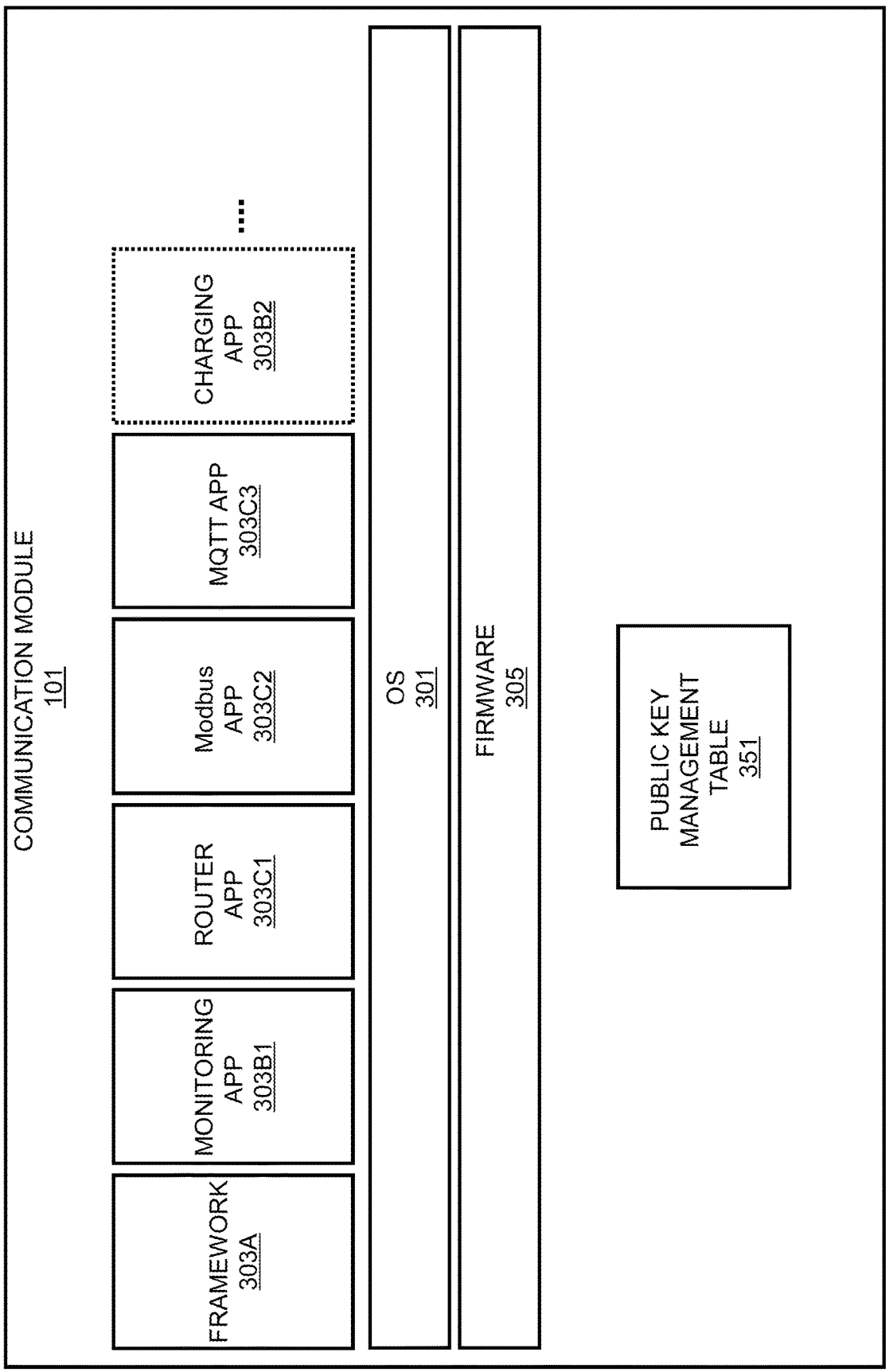
FIG. 3 illustrates a logical configuration of the communication module.

FIG. 3 illustrates a logical configuration of the communication module 101.

A plurality of programs to be executed by the processor 225 include firmware 305, an OS (Operating System) 301, and a plurality of apps 303. The OS 301 may be, for example, an open-source OS, for example, Linux (registered trademark). Further, a public key management table 351 is stored in the memory 223. The public key management table 351 stores a management server ID, and information indicating a public key of the management server 115 for each management server 115. Note that while the present example will be described as a representative of a case where the public key management table 351 manages public keys, private keys can also be managed as described above.

The plurality of apps 303 include a first app 303A to be executed on the OS 301, and one or a plurality of second apps 303O to be executed on the OS 301. The end user or the user can utilize the user application 180 described in FIG. 1 as the app 303 by the communication module 101 downloading the user application 180.

For example, the second app 303C is often an application regarding a system and communication of the communication module 101. A manufacturing company (also referred to as a vendor, a supplier or a provider) of the communication module 101 as well as the user can update firmware or software of each communication module 101 using OTA (On The Air) by way of the management server 170. In this case, the vendor becomes a user. The first app 303A can be updated using OTA, which facilitates security measures and bug fix, so that it is possible to achieve a safer communication module 101.

Each of one or more second apps 303C among one or a plurality of second apps 303C is an app that performs communication in accordance with one or more types of communication protocol on one or more communication interface standards and is an app that can be arbitrarily installed and arbitrarily uninstalled. One example of the one or the plurality of second apps 303C is a router app 303C1 (an app for causing the communication module 101 to function as a router that relays communication in accordance with IP (Internet Protocol)), a Modbus app 303C2 (an app for communication in accordance with Modbus protocol) and a MQTT app 303C3 (an app for communication in accordance with MQTT protocol).

The first app 303A is an app as middleware between the OS 301 and the one or the plurality of second apps. Hereinafter, the first app 303A may be referred to as a "framework".

The communication module 101 includes a plurality of communication interfaces that support a plurality of different types of communication interface standards, and a second app in accordance with the communication interface standards and a type of communication protocol is installed (or activated). Activation refers to an administrator of the second app allowing the user or the end user to utilize the second app which is downloaded from the distribution server 117 and installed on the OS 301 in advance before the second app is executed.

Thereafter, the user or the end user can execute the second app. Upon activation processing, activation and a usage condition of the second app can be grasped by managing processing of the user or the end user requesting activation and processing of the user activating the second app via the management server 115. Thus, a usage fee of the second app can be calculated on the basis of the grasped usage condition. Note that the distribution server 115 may grasp the usage condition, or the second app side may measure a usage period and the number of times of use and transmit the usage period and the number of times of use to the distribution server 117 and the management server 115.

While individual apps 303 are independent of each other, there is a framework 303A as middleware between the OS 301 and one or a plurality of second apps 3030. This supports coordination among the apps 303, which implements a general-purpose communication module 101 that enables data communication not depending on types of interfaces of the industrial equipment 103 to be coupled to the communication module 101.

Note that while the app 303 may be executed in an independent execution environment like a container, which is constructed for each app 303, according to the configuration illustrated in FIG. 3, the app 303 is executed while the app 303 is regarded as a process by the OS 301. It is therefore possible to make a resource amount required for the communication module 101 smaller than a resource amount required for a configuration which requires an execution environment like a container.

It can be expected that the user can provide a service that is more valuable for the end user by collecting data regarding the industrial equipment 103 to be used by the end user to which the communication module 101 is coupled by way of the communication module 101 and analyzing the collected data.

The user or the end user can install the second app 303C created by the user in the communication module 101 or uninstall the second app 303C from the communication module 101.

The second app 303C may be installed (or uninstalled) by a provider of the communication module 101 in response to a request from the user (or without a request from the user).

Upon processing of installation, and the like, the framework 303 can confirm a usage condition of the first app 303 that runs on the framework 303 and an interface with which the first app 303 communicates, can confirm whether the first app 303 is not being used, or if the first app 303 is being used, can perform installation, uninstallation or update processing while the first app 303 is not being used.

By this means, it is only necessary to confirm a condition of each app in a one-to-one relationship of a process such as installation and the framework 303 instead of confirming the condition in a one-to-many relationship of the processes and the framework, which facilitates installation, and the like. Further, it is possible to implement installation, and the like, without inhibiting communication of the industrial equipment 103 coupled to the communication module 101.

The second app 303C may be a second app 303C for the end user prepared by the user, the module provider, or the like, or may be a second app 303C for the user, such as an analysis app. The second app 303C may be an app selected by the user and installed from the distribution server 117 such as an app store.

Specifically, for example, the framework 303A may access the distribution server 117, may display selectable second apps (for example, icons of the second apps) on a web screen of a web browser to be executed at a computer (not illustrated) coupled to the communication module 101 and may install the second app selected by the user from the web screen in the communication module 101. A charged amount with respect to the end user or the user may be determined in accordance with which of the second apps 3030 is used to what extent. A method for determining the charged amount will be described later.

Further, the monitoring app 303B1 is one example of a third app 303B. The framework 303A and the monitoring app 303B1 may be installed (for example, pre-installed) by the provider of the communication module 101. The monitoring app 303B1 will be described later. Note that the framework 303A may also serve as the third app 303B such as the monitoring app 303B1. In other words, the framework 303A may also serve as the monitoring app 303B1. Note that the "third app" may be an app other than the first app and the second app among the apps on the OS 303.

Figure 4:
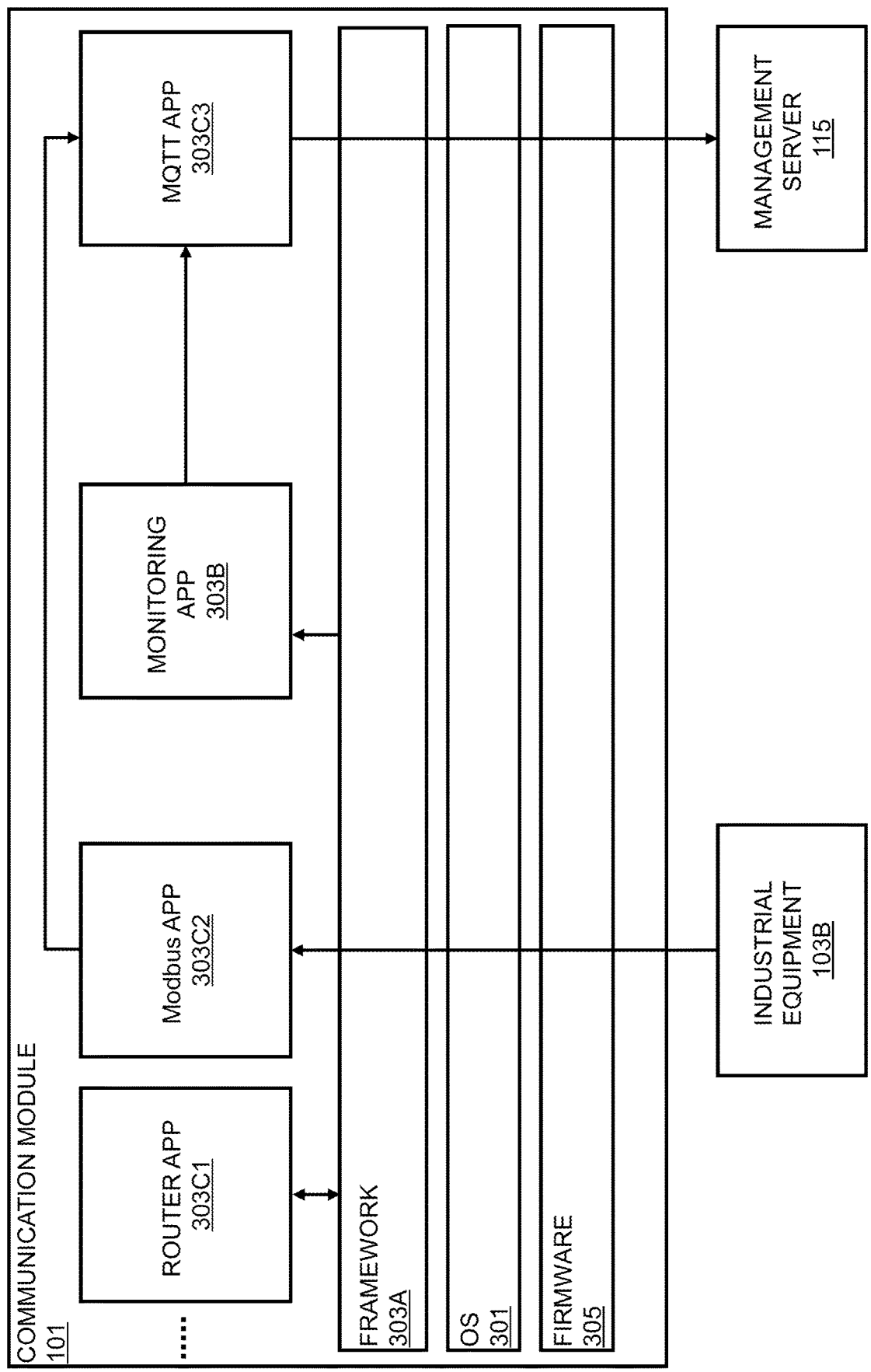
FIG. 4 illustrates one example of flow of data communication.

FIG. 4 illustrates one example of flow of data communication.

The framework 303A manages each second app 303. For example, each second app 303 stores use history (for example, operation information) of the second app 303 in an area set in the memory 223 for the second app 303. The framework 303A may refer to the use history registered in the area corresponding to the second app 303 for each second app 303.

The communication module 101 includes a plurality of communication interfaces that support a plurality of different types of communication interface standards, and thus, each second app 303 may support arbitrary two or more types of communication protocol or communication interface standards.

However, there are a variety of communication protocol and communication interface standards belonging to lower layers of layers regarding the communication protocol.

Thus, there can be an enormous number of combinations of communication protocol and communication interface standards for data communication with the industrial equipment 103 and communication protocol and communication interface standards for data communication with equipment other than the industrial equipment 103.

For example, a case where data is received from the industrial equipment 103 and the received data is transmitted to the management server 115 will be considered. If the industrial equipment 103 supports the Modbus protocol, the Modbus protocol can be used as communication protocol of data reception.

On the other hand, there can be a possible case where communication protocol such as the MQTT protocol and the UDP is used as communication protocol of data transmission to the management server 115. If a single second app needs to perform data communication with the industrial equipment 103 and data communication with equipment other than the industrial equipment 103, development of the second app becomes complicated.

Thus, in the present embodiment, a local second app that performs communication with the industrial equipment 103 coupled to the communication module 101 but does not perform communication with equipment other than the industrial equipment 103 (that is, performs local communication) and a global second app that performs communication with equipment other than the industrial equipment 103 coupled to the communication module 101 but does not perform communication with the industrial equipment 103 (that is, performs global communication) are prepared.

It is expected that development of each of the local second app and the global second app is easier than development of the second app that performs both local communication and global communication. Further, it is not necessary to provide the second app for each combination of communication protocol and communication interface standards for local communication and communication protocol and communication interface standards for global communication, so that it is expected that resources of the communication module 101 can be efficiently used.

While there is a case where accesses, and the like, to the memory collide with each other on the OS if the second app that performs local communication and the second app that performs global communication respectively freely run, the framework can cause the second apps to respectively run by monitoring these second apps and controlling accesses, or the like, to the memory.

According to the example illustrated in FIG. 4, the Modbus app 303C2 is one example of the local second app. In other words, the Modbus app 303C2 which is a local second app is one example of a first type of the second app. Further, the MQTT app 303C3 is one example of the global second app. In other words, the MQTT app 303C2 which is a global second app is one example of a second type of the second app.

For example, the Modbus app 30302 receives data from the industrial equipment 103B coupled to a communication interface that supports communication interface standards (for example, RS485) based on which communication is performed in accordance with the Modbus protocol, by way of the communication interface. The MQTT app 303C3 transmits the data received by the Modbus app 303C2 or data obtained by processing the data to the management server 115, or the like, (one example of a predetermined server) by way of a communication interface that supports communication interface standards based on which communication is performed in accordance with the MQTT protocol.

Note that the MQTT app 303C3 can be one example of the local second app depending on the industrial equipment 103 to be coupled to the communication module 101. Use of the framework according to one embodiment of the present invention enables switching between such local and global coupling and coexistence of a MQTT app for local communication and a MQTT app for global communication as different apps. The second apps 303 may directly or indirectly coordinate as described above.

Taking examples of the Modbus app 303C2 and the MQTT app 303C3, these second apps 303C may coordinate with each other, for example, as follows. The Modbus app 303C2 writes data received from the industrial equipment 103B in an area corresponding to the Modbus app 303C2 among the memory 223.

The MQTT app 303C3 reads data from the area corresponding to the Modbus app 303C2 and transmits the read data to the management server 115. The MQTT app 303C3 can know an address of the area corresponding to the Modbus app 303C2 from a response to an inquiry to the framework 303A or from information set for the MQTT app 303C3.

Further, as will be described later, the user can set a communication timing at which the Modbus app 303C2 receives data and a communication timing at which the Modbus app 303C2 transmits data, in the communication module 101 by way of the framework 303A.

By the way, each second app 303C is executed while the second app 303C is regarded as a process by the OS 301. Each second app 303C writes use history like an execution log (for example, a resource amount) in an area set for the second app 303. The framework 303A does not know what will occur (for example, which kind of resources are to be used to what extent) by execution of each second app 303C.

Thus, in the present embodiment, the monitoring app 303B1 is installed in the communication module 101. The monitoring app 303B1, for example, regularly makes an inquiry to the framework 303A as to whether or not there is data in the area corresponding to the second app 303C for each second app 303C. If there is data, the framework 303A reads the data from the area and returns the data to the monitoring app 303B1, and if there is no data, makes a response indicating that there is no data, to the monitoring app 303B1.

Data received by the monitoring app 303B1 from the framework 303A in response to the inquiry includes information indicating use history of the second app 3030. The monitoring app 303B1 passes the data received from the framework 303A to the MQTT app 30303 which is one example of the global second app in association with an app ID of the monitoring app 303B1 and an app ID of the second app 303C corresponding to the data (for example, writes the data in a predetermined area in the memory 223). The MQTT app 30303 transmits the passed data to the management server 115.

The management server 115 stores data with which the app ID of the monitoring app 303B1 is associated. The data includes information indicating use history of the second app 3030. As a result of the monitoring app 303B1 that monitors a condition within the communication module 101 being executed at the communication module 101 in this manner, it is possible to track each second app 3030 through the framework 303A.

As a result, it is expected that reliability of the communication module 101 can be maintained. For example, it is assumed that the communication module 101 that executes a plurality of second apps 303O goes down. In this case, by the module provider analyzing use history of each second app 303C stored in the management server 115, it can be expected that a problematic second app 303O can be specified. It can be expected that the condition of the communication module 101 is fed back from the module provider to the user in this manner.

It can be further expected that corrected data (or a new version of the app 303O) of the problematic second app 303O is provided to the communication module 101 by way of or without passing through the distribution server 117.

Note that in which area of the memory 223, information indicating use history is to be written is determined in advance for each second app 303O. For example, a setting value indicating an address of a write destination area for each second app 303O may be a value registered in a configuration file input through a setting screen generated by the framework 303A on the basis of a configuration definition file corresponding to the second app 303O which will be described later.

The monitoring app 303B1 can acquire information indicating use history of the second app 303O for each second app 303O by referring to the area determined in advance and can pass data including the information to the global second app such as the MQTT app 303O3.

Further, while in the present embodiment, the global second app 303C such as the MQTT app 303C3 exists, and thus, the monitoring app 303B1 transmits data to the management server 115 by way of the global second app 303C, the monitoring app 303B1 may have a function of global communication, and the monitoring app 303B1 itself may transmit the data to the management server 115.

Further, in place of or in addition to the monitoring app 303B1, other third apps 303B may be installed. For example, a charging app 303B2 which is an app that determines a charged amount may be installed.

The framework 303A may specify a data communication amount which is an amount of data communicated by the second app 303C by way of the communication interface (in other words, a data communication amount except a data communication amount of communication by an app (for example, the monitoring app 303B1) other than the second app 303C).

The data communication amount may be specified from, for example, use history for each app 303. The charging app 303B2 may determine a charged amount on the basis of the specified data communication amount. The determined charging amount may be a charged amount for use of the communication module 101 or may be a charged amount for use of the industrial equipment 103 to which the communication module 101 is coupled.

While in the present embodiment, the charged amount is determined by a core apparatus such as the management server 115 as will be described later, the charged amount may be determined by an edge apparatus such as the communication module 101 coupled to the industrial equipment 103.

Figure 5:
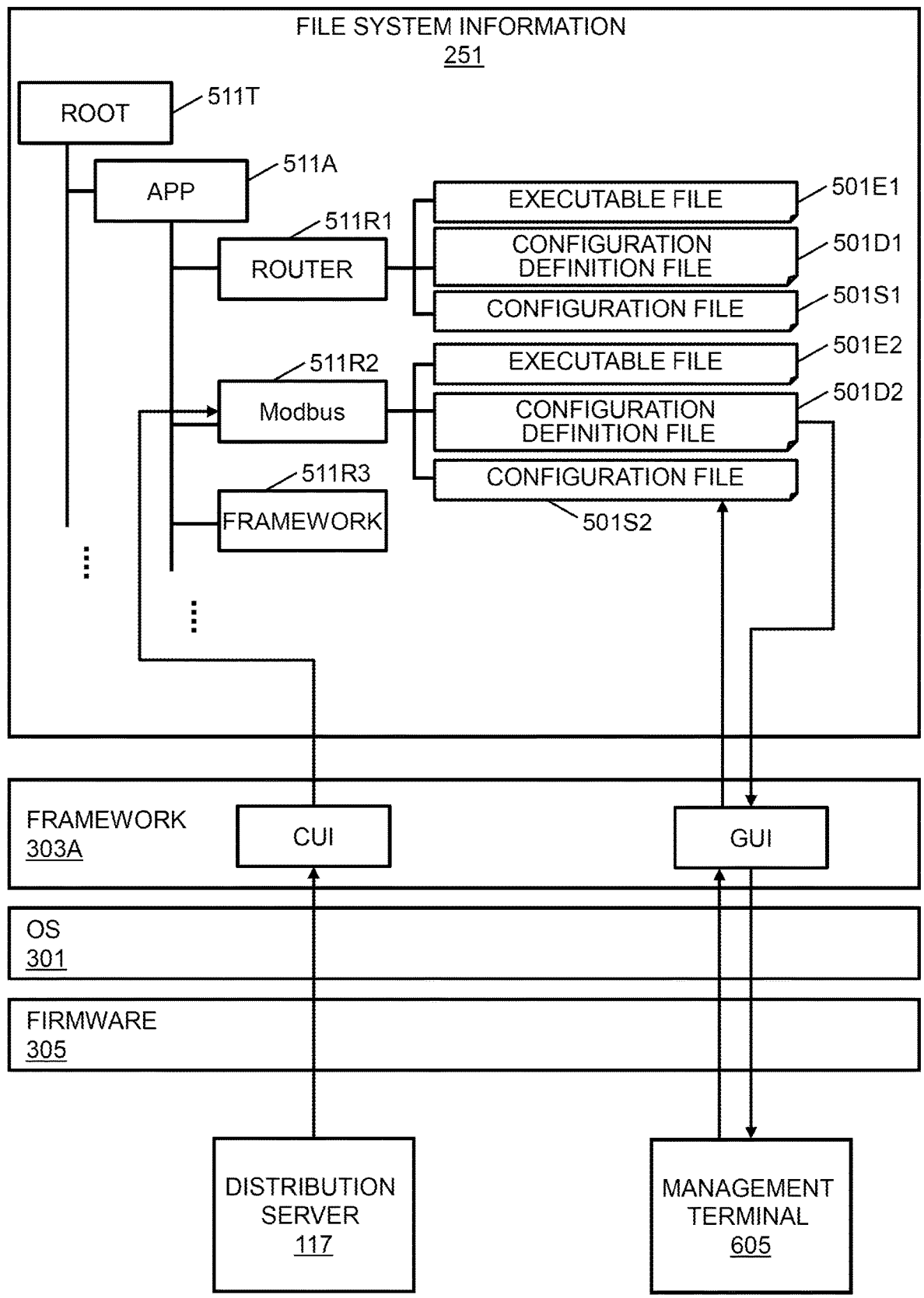
FIG. 5 illustrates outline of installation of an app and settings regarding the app.

FIG. 5 illustrates outline of installation of the app 303 and settings regarding the app 303.

According to the file system information 251, there are directories 511 and files 501 in a tree structure. Specifically, for example, an app top directory 511A exists under a root directory 511T, and an app directory 511R is created for each app 303 immediately under the app top directory 511A.

A data set regarding the app 303 corresponding to the app directory 511R is stored in the app directory 511R. Note that each of the directories 511 and files 501 may be one example of an object.

While a setting value for the app (application program) is typically input by an operator through the setting screen, the app setting screen is a screen specific to the app based on information described in a source code of the app. It is considered that if a configuration of each app is specific to the app, coordination among the apps becomes complicated.

This is because if the interface is different for each app, the end user or the user of the communication module 101 needs to learn a utilization method of the interface for each app. Further, if interface information is provided for each app, the memory of the communication module 101 is consumed, and an amount of resources used by the processor increases. Thus, by using a common interface, it is possible to reduce an amount of resources used in the communication module 101 which is embedded equipment having smaller resources compared to general-purpose equipment.

Thus, in the present embodiment, an app structure formed from an executable file 501E1, a configuration definition file 501F2 and a configuration file 50153 is employed for at least the second app 303C.

The executable file 501E is a file corresponding to a body of the second app 303C. Execution of the second app 303C is execution of the executable file 501E of the second app 303C. The configuration definition file 501F2 is a file indicating one or more setting items for the second app 303C.

The configuration file 501S3 is a file in which one or more input setting values are registered in a case where the one or more setting values are input for one or more setting items. The framework 303A constructs and provides a setting screen on the basis of the configuration definition file 501F2 and registers the setting values input to the setting screen, in the configuration file 501S3.

Each second app 303C is executed in accordance with the setting values registered in the configuration file 501S3 corresponding to the second app 303C. This makes coordination among the apps 303 easier. Further, the setting screen is constructed and provided by the framework 303A, and thus, it is considered that the second app 303 can be easily developed.

The framework 303A provides a CUI (Character User Interface) as one example of an interface for installing the app 303. Installation of the app 303 may be storage of the app structure in the app top directory 511A (one example of a predetermined directory) by the distribution server 117 by way of the CUI provided by the framework 303A.

For example, according to the example illustrated in FIG. 5, a Modbus directory 511R2 is created in the app top directory 511A, and an app structure (an executable file 501E2, a configuration definition file 501D2 and a configuration file 501S2) of the Modbus app 303C2 is stored in the Modbus directory 511R2. This storage processing is preferably performed when the Modbus app 303C2 is installed.

Further, while installation of the app 303 in the communication module 101 may be so-called pull-type installation that is performed in response to a request from the end user, in the present embodiment, so-called push-type installation that is actively performed by the distribution server 117 without a request from the end user (for example, performed in response to a request from the user or the module provider) is performed.

By this means, the user or the module provider can expect that reliability of the communication module 101 can be maintained. The distribution server 117 is one example of a system to be managed by an entity other than the end user. To reduce load on a network, a timing of push-type installation and an app distribution timing are preferably changed on the basis of information regarding serial number of the communication module 101, IMEI (International Mobile Equipment identity) of the SIM card 211, and a communication carrier to be coupled.

The framework 303A provides a GUI (Graphical User Interface) as one example of the interface as the setting screen of the app 303. According to the example illustrated in FIG. 5, the Modbus app 303C2 is employed as an example.

The framework 303A generates a setting screen that accepts one or more setting values for one or more setting items indicated in the configuration definition file 501D2 on the basis of the configuration definition file 501D2 of the designated Modbus app 303C2 and provides the generated setting screen.

For example, a management terminal 605 is coupled to the communication module 101 so as to be able to perform communication by way of or without passing through the network 109. The management terminal 605 may be one example of a computer including an input/output apparatus.

The setting screen generated by the framework 303A is provided to the management terminal 605 and displayed. An operator of the management terminal 605 inputs one or more setting values for one or more setting items displayed on the setting screen. The framework 303A registers the one or more setting values input to the setting screen, in the configuration file 501S2 of the Modbus app 303C2.

The Modbus app 303C2 is executed (for example, a cycle of collecting data from the industrial equipment 103 in accordance with the Modbus protocol and a storage destination area of collected data are determined) in accordance with the setting values registered in the configuration file 501S2.

Note that while the framework 303A may manage installation management information (for example, a list of installed apps) of the app 303, in the present embodiment, the framework 303A can regard an app for which an app structure is stored in the app top directory 511A as an installed app and can avoid management of the installation management information of the app.

The framework 303A specifies the installed second app 303C by referring to the app top directory 511A. In a case where the installation management information is managed, if power supply to the communication module 101 is shutdown or disconnected during installation of the second app 303, inconsistency can occur between a structure under the app top directory 511A and content indicated in the installation management information. In the present embodiment, existence of the app structure under the app top directory 511A is regarded as the installed app 303, and thus, inconsistency as described above is less likely to occur, so that management cost of installation information of the app can be reduced.

Figure 6:
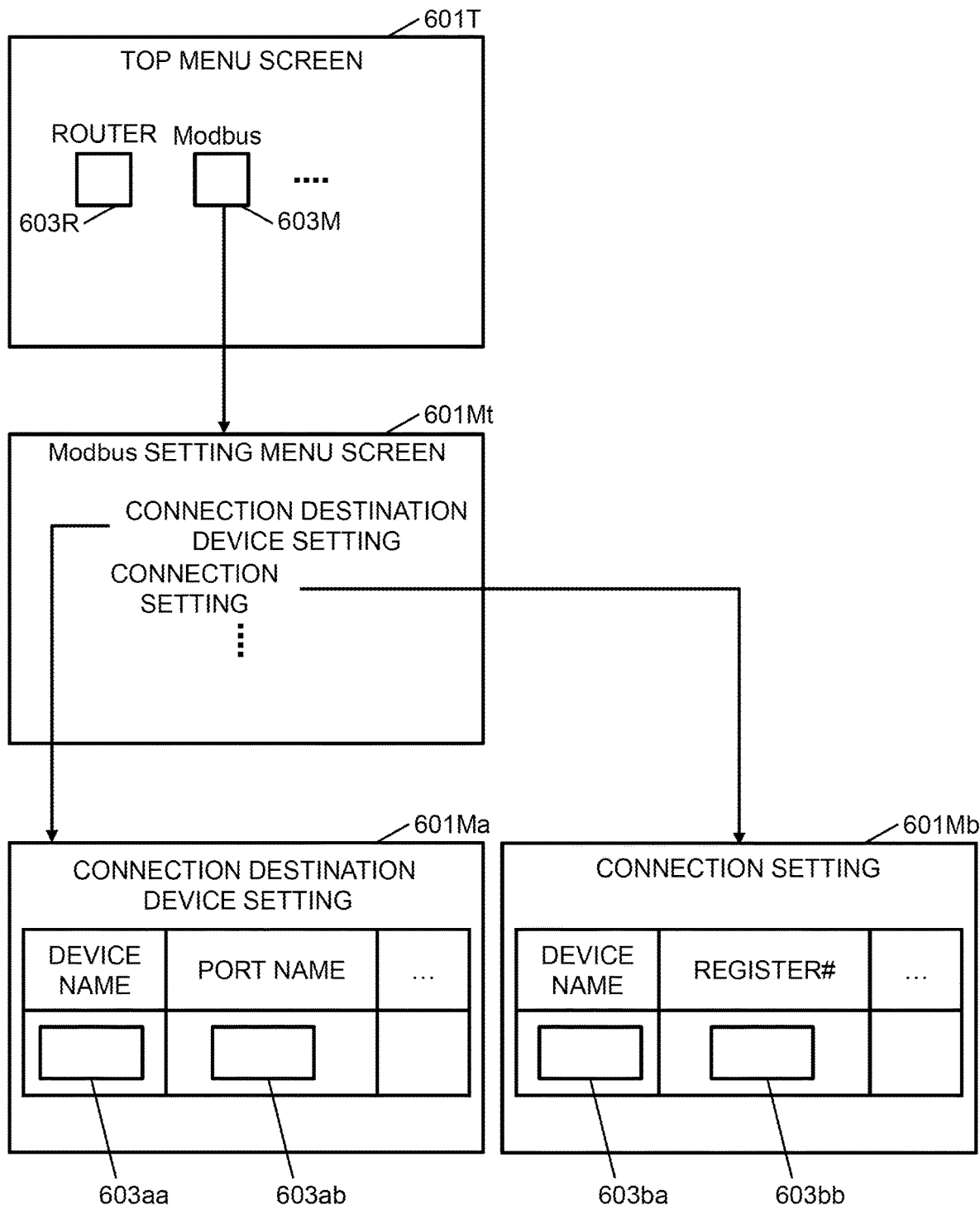
FIG. 6 illustrates one example of flow of the settings regarding the app.

FIG. 6 illustrates one example of flow of settings regarding the app.

The framework 303A provides the setting screen. Specifically, for example, the framework 303A specifies the installed apps by referring to the app top directory 511A and provides a menu screen 601T on which a list of the specified apps (for example, a list of icons 603R of the specified apps) is displayed.

If an operator designates one of the icons 603R of the apps, the framework 303A generates a setting screen that is a GUI (for example, a GUI having a UI for inputting setting values for each of one or more setting items indicated in the configuration definition file 501D) that accepts one or more setting values for one or more setting items indicated in the configuration definition file 501D on the basis of the configuration definition file 501D corresponding to the designated icon 603R and provides the generated setting screen.

According to the example illustrated in FIG. 6, an icon 603R2 corresponding to the Modbus app 303C2 is designated. Further, setting items are hierarchized into, for example, primary items and sub items. In this case, the framework 303A first generates a menu screen 601M on which a list of one or more primary setting items (for example, one or more icons respectively indicating one or more primary setting items) described in the configuration definition file 501D2 with reference to the configuration definition file 501D2 of the Modbus app 303C2 and provides the menu screen 601M.

In a case where one of the primary setting items is designated from the menu screen 601M, the framework 303A specifies one or more sub setting items belonging to the designated primary setting item from the configuration definition file 501D2, generates a setting screen 601A having a UI (UI for inputting setting values) 605 for each of the specified sub setting items and provides the generated setting screen 601A.

For example, in a case where a primary setting item of "coupling destination device setting" is designated, a setting screen 601A1 on which input UIs 605*aa*, 605*ab*, respectively corresponding to sub setting items of "device name", "port name", . . . are displayed is provided. Further, for example, in a case where a primary setting item of "coupling setting" is designated, a setting screen 601A2 on which input UIs 605*ba*, 605*bb*, respectively corresponding to sub setting items of "device name", "register #", . . . are displayed is provided.

An example of screen transition is not limited to the example illustrated in FIG. 6. For example, in a case where the icon 603R of the app is designated, a setting screen in which the screen 601M and the screen 601A are integrated, that is, a setting screen on which sub setting items and input UIs 605 are displayed for each primary setting item may be displayed.

In this manner, the framework 303A can generate and provide the setting screen on the basis of the configuration definition file 501D of the app.

Note that the setting screen may be provided to the management terminal 605 (one example of a computer) illustrated in FIG. 5. Further, the setting screen may be a screen that can be displayed by a web browser that is to be executed on the management terminal 605. Setting values can be input by way of a typical browser such as a web browser, so that high user-friendliness can be achieved.

Figure 7:
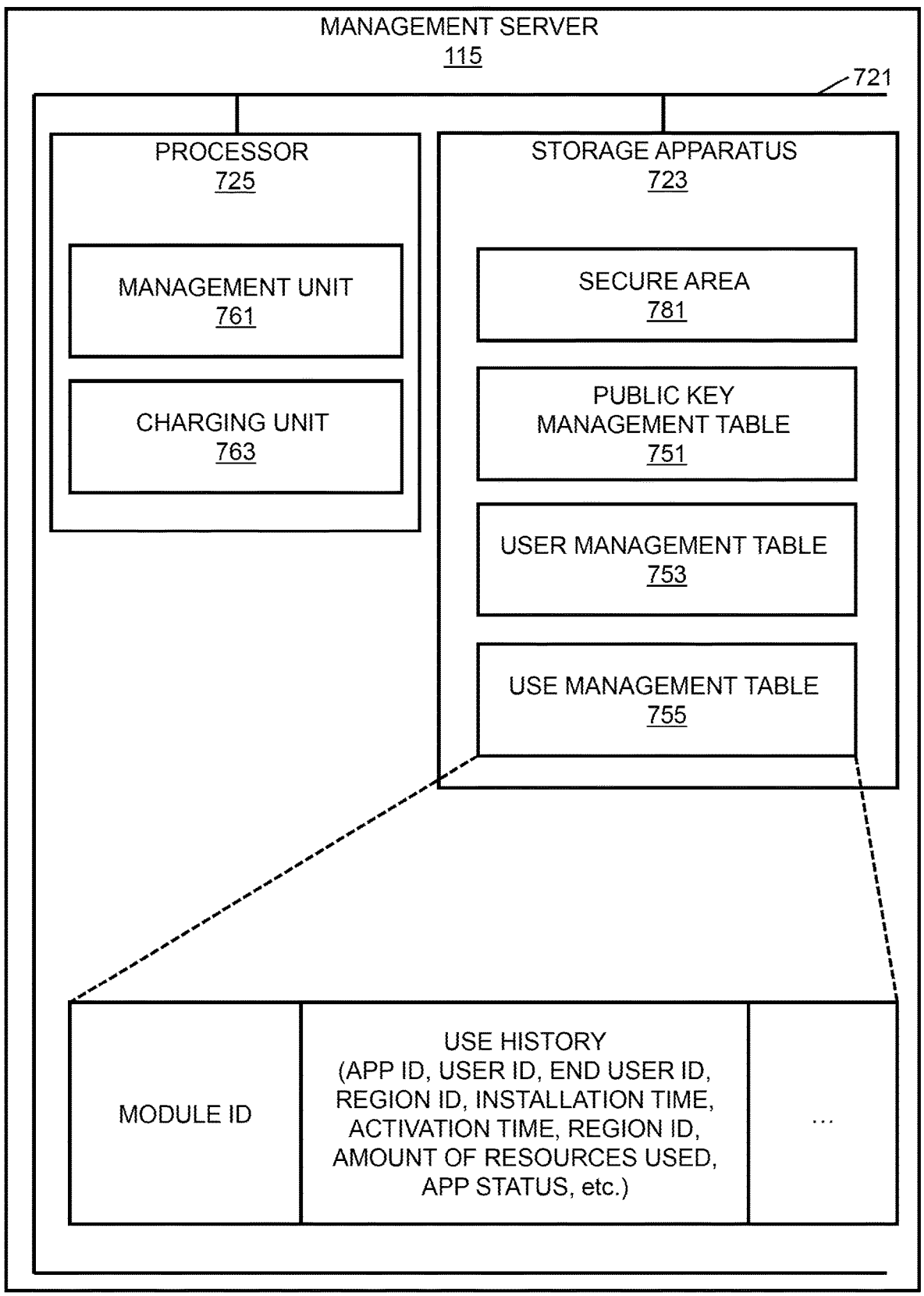
FIG. 7 illustrates a configuration of a management server.

FIG. 7 illustrates one example of a configuration of the management server 115.

The management server 115 may be a computer system including an interface apparatus 721, a storage apparatus 723 and a processor 725 coupled to the interface apparatus 721 and the storage apparatus 723 or may be a virtual system implemented by one or more programs being executed in the computer system.

By at least one program among the programs stored in the storage apparatus 723 being executed, functions of a management unit 761 and a charging unit 763 are implemented at the processor 725.

The storage apparatus 723 may have a secure area 781. The secure area 781 may store a private key or a public key of the management server 115.

The storage apparatus 723 stores a public key management table 751, a user management table 753 and a use management table 755.

The public key management table 751 in a case where a private key is stored in the secure area 781 stores a communication module ID and information indicating a public key of the communication module 101 for each communication module 101.

The user management table 753 stores a user ID, information on the user (for example, contact information (for example, an e-mail address), a module ID of the communication module 101 to be used, and information on the industrial equipment 103 coupled to the communication module 101) for each user.

The use management table 755 stores a module ID and information indicating app use history of the communication module 101 for each communication module 101. The app use history may include at least one of the following for each app 303 installed in the communication module 101.

app ID: ID of the app 303 in the communication module 101
user ID: ID of the user who uses the app 303
end user ID: ID of the end user who uses the app 303
installation time: time at which the app is installed
activation time: time at which the installed app is activated (for example, start of use is requested)
region ID: ID of a region to which the communication module 101 belongs upon execution of the app
amount of resources used: an amount of resources used upon execution of the app
app status: a status of app (for example, normal or abnormal)

Specification of a region in which the communication module 101 is to be disposed upon execution of the app is, for example, detected on the basis of a GPS signal received by the communication module 101 that executes the app. The region may be detected on the basis of information on a base station to which the SIM card 211 is to be coupled and a communication carrier, and a GNSS (Global Navigation Satellite System) signal.

Further, the "resources" are resources of the communication module 101 (typically, computational resources such as the communication interface, the memory 223 and the processor 225). As the "amount of resources used", various amounts of resources used such as a data communication amount, a processor use rate, a processor usage period and an amount of a memory used can be employed.

Data including information indicating app use history (for example, the amount of resources used) for each app 303 at the communication module 101 is acquired by the monitoring app 303B1 in the communication module 101 from the memory 223 through, for example, the OS 301 and transmitted from the monitoring app 303B1 to the management server 115 through, for example, the global second app 303C. The management unit 761 registers the data in a field corresponding to the communication module 101 which is a transmission source of the data in the use management table 755. The charging unit 763 determines a charged amount regarding use of the communication module 101 on the basis of the use management table 755.

A modified example where the monitoring app 303B1 monitors items other than a sensor and a status of the industrial equipment 103 coupled to the communication module 101 will be described. The app may be executed as the second app separately from the monitoring app 303B1. For example, the monitoring app 303B1 can update firmware of equipment coupled to the communication module 101.

The monitoring app 303B1 monitors revision information of firmware of the industrial equipment 103, content of the firmware, revision information of firmware corresponding to the industrial equipment 103 registered in the distribution server 117, and content of the firmware.

In a case where the firmware stored in the distribution server 117 is updated or registered, the firmware of the industrial equipment 103 is compared with the firmware, and in a case where there is a difference, existence of new firmware of the industrial equipment 103 is displayed at the end user client 113.

In a case where the existence of new firmware is displayed and the user or the end user agrees to update the firmware, the communication module 101 updates the firmware of the coupled industrial equipment 103. A charged amount can be determined or calculated using the number of times the firmware is updated, a period during which communication is performed, or the like. The charged amount can be determined, calculated and managed at the distribution server 117 or the management server 115. Further, in a case where the user or the end user subscribes to automatic updating of the firmware, the firmware may be updated as appropriate during a subscription period, in which case, subscription information is preferably registered, and the like, in the monitoring app 117. In a case where the subscription expires or before the subscription expires, it is preferable to confirm whether or not to update the subscription to the user or the end user. In a case where the subscription expires, it is also possible to individually perform charging, which enables updating of the firmware that meets the need of the user.

Figure 8:
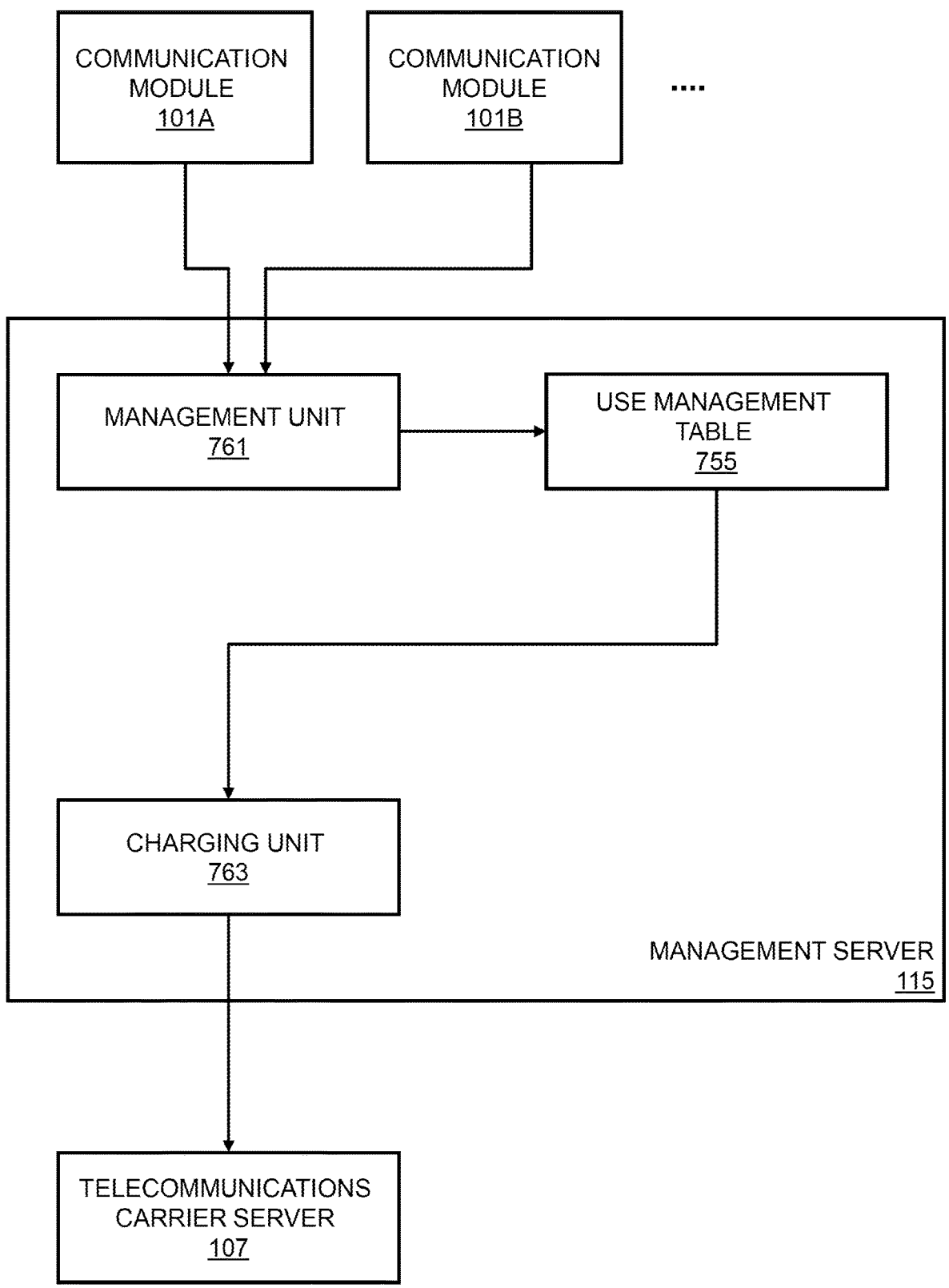
FIG. 8 illustrates outline of flow of charging.

FIG. 8 illustrates outline of flow of the charged amount and a charging method using a usage condition and use history of the app.

In the management server 115, the management unit 761 receives data from the communication modules 101A, 101B, . . . . For each communication module 101, the received data includes information indicating app use history in the communication module 101. The management unit 761 registers the received data in a field corresponding to the communication module 101 which is a transmission source of the data.

The charging unit 763 selects the communication module 101 for which the charged amount for a predetermined period has not been determined among the communication modules 101 indicated in the use management table 755 and acquires information indicating app use history for the communication module 101 from the use management table 755. The information indicating the app use history may be specified by the charging unit 763 from data from the communication module 101 instead of being registered in the use management table 755 (that is, the use management table 755 does not have to be provided). The charging unit 763 determines the charged amount regarding use of the communication module 101 on the basis of the information indicating the app use history.

For example, the charging unit 763 may specify use history of each second app 303C from the information indicating the app use history and may determine the charged amount regarding use of the communication module 101 on the basis of use history of each second app 303C.

According to the communication module 101, the second app 303C can be installed in response to a request from the user. Further, the framework 303A in the communication module 101 may accept from the user (or the end user), designation of the second app 303C desired by the end user among one or more installed second apps 303C and may activate the designated second app 303C.

While the second app 303C can be arbitrarily installed or activated in this manner, use history of each second app 303C is monitored, and the management server 115 is notified of the use history of each second app 303C. The charged amount regarding use of the communication module 101 is determined on the basis of such app use history.

In this example, the charged amount is only based on the app use history (for example, an amount of resources used) associated with use of the second app 303C which is an app that can be arbitrarily installed (or activated) and is not based on app use history (for example, a data communication amount of the monitoring app 303B1) that is not associated with use of the second app 303C.

It is therefore expected that an amount to be charged is appropriate for the user, and it is expected to promote utilization of a general-purpose communication module 101 that enables data communication not depending on types of the industrial equipment 103.

Note that the "charged amount regarding use of the communication module 101" may be the charged amount for each user or may be the charged amount for each end user of the user for each user. The user may determine an amount to be charged to the end user on the basis of the charged amount for each end user.

Further, the use history of the second app 303C includes information indicating activation time of the second app 303C. While the charged amount may be determined on the basis of a usage period from the installation time, it is expected that a more appropriate charged amount can be determined by being based on a usage period from the activation time.

The communication module 101 includes a SIM card 211 (one example of a card in which subscriber identification information is stored) which supports a predetermined communication network (for example, a communication network 109A or 109B) and in which subscriber identification information is stored. The second app 303C (for example, the global second app) may transmit data including the subscriber identification information within the SIM card 211 to the management server 115 at a communication timing as one example of a setting value set by way of the setting screen provided by the framework 303A.

In this manner, a transmission timing of the data including the subscriber identification information can be restricted to the communication timing set by way of the framework 303A. Note that the charging unit 763 may transmit information indicating the determined charged amount to a telecommunications carrier (for example, the telecommunications carrier server 107) that manages the predetermined network (for example, the communication network 109A or 109B) so as to enable the telecommunications carrier to charge a fee reflecting the determined charged amount.

By this means, it can be expected that a communication fee to be charged to the user (or the end user) from the telecommunications carrier that manages the predetermined network used for communication of the communication module 101 reflects the charged amount for the user (or the end user).

The charging unit 763 may determine a charged amount A regarding the communication module 101A (one example of the first communication module) and a charged amount B regarding the communication module 101B (one example of the second communication module) on the basis of activation time of a certain second app 303C (the second app 303C that is the same as the certain second app 303C) indicated in the app use history of the communication module 101A and activation time of the same second app 303C indicated in the app use history of the communication module 101B.

In this manner, an amount regarding use of the common second app 303C can be determined on the basis of the activation time (for example, a usage period from the activation time) of the second app 303C. For example, out of a fee for use of the certain second app 303C among the charged amount A and a fee for use of the same second app among the charged amount B, the fee for which activation time of the second app 303C is earlier may be cheaper. This can promote active utilization of the second app 303C.

The fee for which the activation time is earlier is cheaper means that unit price of monthly or annual subscription of the app 303C is made lower. A usage fee or a rate of the usage fee for a user who has already activated the app can also be made lower every time the number of times of activation of the app 303C exceeds a predetermined number.

For example, in a case where a first number of users use the second app 303C, a fee for a first user who utilizes the app from first time is A yens per month, and a fee for a second user who utilizes the app from second time later than the first time is B yens per month. Thereafter, in a case where the number of users who use the common second app 303C increases from the first number of users to a second number of users, a fee for the first user is preferably made C yens which is cheaper than A yens per month, and a fee for the second user is preferably made D yens which is cheaper than B yens per month.

Further, if the relationship becomes B<D, more favorable treatment can be given to the first user, which leads to promotion of utilization of the app. This results in proceeding of debug and updating of the app by the user, so that it is possible to construct an ecosystem in which the communication module 101 that can be utilized at ease is created by the whole of the vendor, the user and the end user.

The management unit 761 may restrict use of all or part of the communication module 101 for which the charged amount is determined if the determined charged amount has not been paid until due date for payment. In this manner, the management server 115 can impose a restriction of use of the communication module 101.

One of the apps 303 in the communication module 101 may specify a region in which the communication module 101 exists (for example, the region may be specified through communication with a predetermined server on the basis of a location detected by a GPS signal). In a case where the specified region is a predetermined region, one of the apps in the communication module 101 may restrict communication using the subscriber identification information corresponding to a communication network belonging to the predetermined region.

This can avoid the communication module 101 from performing communication without restriction in a region in which the module provider desires to restrict communication. Note that the app 303 that specifies the region and the app 303 that restricts communication may be the same as or different from each other or may be one of the first app, the second app and the third app. This can restrict data to be dealt with for each region and country, which allows the user or the end user to perform data communication of industrial equipment at ease.

For example, there may be a plurality of management servers 115A and 115B that belong to a plurality of regions to which the plurality of communication networks 109A and 109B (see FIG. 1) belong. The management unit 761 of the management server 115A that belongs to a region in which the communication module 101A exists may specify an allowance region in which communication of the communication module 101A is allowed.

In a case where the region in which the communication module 101A exists does not correspond to the allowance region (for example, in a case where the communication module 101A exists not in a region to which the communication network 109A belongs but in a region to which the communication network 109B belongs), the management unit 761 of the management server 115A may restrict communication using the subscriber identification information corresponding to the communication network 109B belonging to the region.

Further, processing as follows may be performed in place of or in addition to at least part of the above-described processing.

Data to be transmitted/received between the communication module 101 and the management server 115 may be encrypted and decrypted in accordance with a public key cryptosystem. In other words, in a case where the app 303 in the communication module 101 transmits data to the management server 115, the app 303 may encrypt the data using a public key (public key specified from the public key management table 351) of the management server 115 and may transmit the encrypted data to the management server 115.

The management unit 761 of the management server 115 may decrypt the data using a private key of the management server 115. On the other hand, in a case where the management unit 761 of the management server 115 transmits data to the communication module 101, the management unit 761 may encrypt the data using a public key (public key specified from the public key management table 751) of the communication module 101 and may transmit the encrypted data to the communication module 101. One of the apps 303 in the communication module 101 may decrypt the data using a private key of the communication module 101.

In such an environment, for example, one of the apps 303 in the communication module 101 may encrypt the subscriber identification information within the SIM card 211 using the public key of the management server 115 and may transmit the encrypted subscriber identification information to the management server 115.

In a case where communication is performed by way of a communication network to which the communication module 101 is coupled, one of the apps 303 in the communication module 101 may encrypt data including the subscriber identification information and data to be transmitted (for example, data acquired from the industrial equipment 103) using the public key of the management server 115 and then, may transmit the encrypted data to the management server 115 on the basis of a communication timing set through the framework 303A.

The management unit 761 of the management server 115 may receive the encrypted data and may decrypt the data using the private key of the management server 115. The management unit 761 may specify the communication module 101 on the basis of the subscriber identification information of the decrypted data and may authenticate communication of the specified communication module 101.

The charging unit 763 may determine the charged amount regarding the communication module 101 on the basis of a data communication amount of the communication module 101 for which communication is authenticated (a data communication amount specified from app use history indicated in the data to be transmitted of the decrypted data).

The data to be transmitted from the communication module 101 may include activation information indicating activation of the app 303 installed in the communication module 101 (for example, reception of a request for use from the user or the end user to the management server 115).

As a result, the activation information may also be encrypted using the public key of the management server 115. The charging unit 763 of the management server 115 may determine the charged amount regarding the communication module 101 using the activation information of the decrypted data.

The data indicating the determined charged amount may be transmitted to the telecommunications carrier (for example, the telecommunications carrier server 107) that manages the communication network through which the encrypted data passes. A communication fee to be charged to the user (or the end user) by the telecommunications carrier may reflect the above-described determined charged amount.

The charging unit 763 may determine a charged amount regarding the communication module 101A and a charged amount regarding the communication module 101B using time at which the communication module 101A activates the app and time at which the communication module 101B activates the same app. For example, the charged amount regarding the communication module for which activation time is earlier between the activation time at the communication module 101A and the activation time at the communication module 101B, may be cheaper.

In a case where the management unit 761 of the management server 115 receives information indicating that the user has paid a fee to the telecommunications carrier, the management unit 761 may allow continuation of communication of the communication module 101 to be used by the user or continuation of use of the app 303 in the communication module 101.

In a case where the management unit 761 of the management server 115 does not receive information indicating that the user has paid a fee to the telecommunications carrier, the management unit 761 may prohibit communication of the communication module 101 or use of the app 303 in the communication module 101.

In a case where the management unit 761 of the management server 115 does not receive information indicating that the user has paid a fee to the telecommunications carrier, the management unit 761 may allow communication of the communication module 101 for a predetermined period or continuation of use of the app for a predetermined period.

The management server 115 may be provided for each predetermined region. The SIM card 211 of the communication module 101 may store a plurality of pieces of the subscriber identification information corresponding to a plurality of communication networks to which the communication module 101 is to be coupled. The management unit 761 of the management server 115 or one of the apps 303 in the communication module 101 may specify subscriber identification information to be used by the communication module 101 by specifying information indicating a region in which the communication module 101 exists and the communication network belonging to the region.

For example, one of the apps 303 in the communication module 101 may make settings so as to prohibit communication to the management server 115 belonging to a predetermined region depending on the region in which the communication module 101 exists.

Further, for example, in a case where the management unit 761 of the management server 115 receive data from the communication module 101 existing in the predetermined region or in a case where communication using predetermined subscriber identification information among the plurality of pieces of subscriber identification information is performed, the management unit 761 may prohibit communication of the communication module 101. "Prohibition of communication of the communication module 101" may prohibition of communication by the communication module 101 using the predetermined subscriber identification information.

However, in this case, while global communication of the communication module 101 is prohibited, local communication is preferably allowed. By allowing local communication, it is possible to maintain operation of the industrial equipment 103 to be coupled to the communication module 101.

While one embodiment has been described above, this is an example for describing the present invention and does not intend to limit a scope of the present invention only to this embodiment. The present invention can be implemented in other various forms.

REFERENCE SIGN LIST

101: communication module

The invention claimed is:

1. A communication module comprising:
a plurality of communication interfaces that support a plurality of different types of communication interface standards;
a memory in which a plurality of programs including an OS (Operating System) are stored; and
a processor coupled to the plurality of communication interfaces and the memory and configured to execute the plurality of programs,
wherein the plurality of programs include a first app to be executed on the OS and one or a plurality of second apps to be executed on the OS,
each of one or more second apps among the one or the plurality of second apps is an app that performs communication in accordance with one or more types of communication protocol on one or more communication interface standards and is an app that is arbitrarily installable and arbitrarily uninstallable, and
the first app is an app as middleware between the OS and the one or the plurality of second apps.

2. The communication module according to claim 1,
wherein each of the one or the plurality of second apps has an app structure including:
an execution object of the second app;
a configuration definition object indicating one or more setting items for the second app; and
a configuration object in which one or more setting values are registered in a case where the one or more setting values are input for the one or more setting items,
for each of the one or the plurality of second apps, the second app is executed on a basis of the configuration object of the second app, and
the first app
generates a setting screen that is a UI (User Interface) that accepts one or more setting values for one or more setting items indicated by a configuration definition object of a designated second app on a basis of the configuration definition object,
provides the generated setting screen, and
registers one or more setting values input to the setting screen for one or more setting items displayed on the setting screen in a configuration object of the designated second app.

3. The communication module according to claim 2,
wherein the setting screen is a screen that is displayable by a web browser that is to be executed on a computer coupled to the communication module so as to be able to perform communication.

4. The communication module according to claim 2,
wherein one or a plurality of app structures respectively corresponding to the one or the plurality of second apps are stored in a predetermined directory in a file system,
in each app structure, an execution object, a configuration definition object and a configuration object are respectively an executable file, a configuration definition file and a configuration file, and
the first app specifies installation of the one or the plurality of second apps by referring to the predetermined directory.

5. The communication module according to claim 4,
wherein an app structure of a second app is stored in the predetermined directory from a system to be managed by an entity other than an end user of the communication module without a request from the end user.

6. The communication module according to claim 1,
wherein a first type of a second app receives data by way of a communication interface that supports communication interface standards based on which communication is performed in accordance with communication protocol that supports the first type of the second app, from equipment coupled to the communication interface, and
a second type of a second app that is a second app different from the first type of the second app transmits data received by the first type of the second app or data obtained by processing the data to a predetermined server by way of a communication interface that supports communication interface standards based on which communication is performed in accordance with communication protocol that supports the second type of the second app.

7. The communication module according to claim 6,
wherein the plurality of programs include a monitoring app as a third app,
an amount of resources used by at least one second app is stored in the memory by the OS,
the monitoring app makes an inquiry to the first app as to the amount of resources used by the at least one second app, and
passes data which is acquired from the memory by the first app in response to the inquiry and which indicates the amount of resources used returned from the first app to the second type of the second app, and
the second type of the second app transmits the passed data to the predetermined server.

8. The communication module according to claim 1,
wherein the plurality of programs include a monitoring app as a third app,
an amount of resources used by at least one second app is stored in the memory by the OS, and
the monitoring app
makes an inquiry to the first app as to the amount of resources used by the at least one second app, and
transmits data which is acquired from the memory by the first app in response to the inquiry and which indicates the amount of resources used returned from the first app to a server by way of one of the second apps or without passing through one of the second apps.

9. The communication module according to claim 1, wherein the plurality of programs include a charging app as a third app,
the first app specifies a data communication amount that is an amount of data communicated by way of a communication interface by a second app, and
the charging app determines a charged amount regarding use of the communication module on a basis of the specified data communication amount.

10. A communication system comprising:
a communication module having a plurality of communication interfaces that support a plurality of different types of communication interface standards; and
a server,
wherein the communication module includes an OS (Operating System), a first app to be executed on the OS, and one or a plurality of second apps to be executed on the OS,
each of one or more second apps among the one or the plurality of second apps is an app that performs communication in accordance with one or more types of communication protocol on one or more communication interface standards and is an app that is arbitrarily installable and arbitrarily uninstallable,
the first app is an app as middleware between the OS and the one or the plurality of second apps,
a first type of a second app receives data by way of a communication interface that supports communication interface standards based on which communication is performed in accordance with communication protocol that supports the first type of the second app, from equipment coupled to the communication interface, and
the first type of the second app itself or a second type of a second app that is a different second app transmits data to the server by way of a communication interface that supports communication interface standards based on which communication is performed in accordance with communication protocol that supports the second type of the second app.

11. The communication system according to claim 10, wherein data to be transmitted from the second type of the second app includes data including a data communication amount that is an amount of data communicated by way of a communication interface by a second app and indicating app use history that is use history of the second app, and
the server determines a charged amount regarding use of the communication module on a basis of the app use history specified from the data from the second type of the second app.

12. The communication system according to claim 11, wherein the app use history includes information indicating a second app and activation time of the second app.

13. The communication system according to claim 11, wherein the communication module includes a card which supports a predetermined communication network and in which subscriber identification information is stored, and
the second type of the second app transmits data including the subscriber identification information within the card to the server at a communication timing set by way of the first app.

14. The communication system according to claim 13, wherein the server transmits information indicating the determined charged amount to a telecommunications carrier that manages the predetermined communication network so as to enable the telecommunications carrier to charge a fee reflecting the determined charged amount.

15. The communication system according to claim 11, wherein the communication module includes at least a first communication module and a second communication module, and
the server determines a first charged amount regarding the first communication module and a second charged amount regarding the second communication module on a basis of activation time of a certain second app indicated in app use history of the first communication module and activation time of the same second app indicated in app use history of the second communication module.

16. The communication system according to claim 15, wherein a fee for which activation time of the second app is earlier is cheaper between a fee for use of the certain second app among the first charged amount and a fee for use of the same second app among the second charged amount.

17. The communication system according to claim 11, wherein the server restricts use of all or part of a communication module for which the charged amount is determined if the determined charged amount has not been paid until due date for payment.

18. The communication system according to claim 10, wherein, for each of a plurality of communication networks belonging to a plurality of regions, the communication module includes a card in which subscriber identification information of the communication network is stored,
one of apps in the communication module specifies a region in which the communication module exists, and
in a case where the specified region is a predetermined region, one of the apps in the communication module restricts communication using subscriber identification information corresponding to a communication network belonging to the predetermined region.

19. The communication system according to claim 10, wherein the server includes a plurality of servers belonging to a plurality of regions to which a plurality of communication networks belong,
the communication module includes a card in which subscriber identification information of a communication network is stored for each of the plurality of communication networks, and
a server belonging to a region in which the communication module exists
specifies an allowance region that is a region in which communication of the communication module is allowed, and
in a case where a region in which the communication module exists does not correspond to the allowance region, restricts communication using subscriber identification information corresponding to a communication network belonging to the region.

20. A communication method comprising:
installing a second app which supports communication interface standards to be used in communication, which is to be executed on an OS (Operating System) and which is arbitrarily uninstallable, in a communication module including a plurality of communication interfaces that support a plurality of different types of communication interface standards, the OS and a first app to be executed on the OS; and the second app performing communication in accordance with communication protocol on communication interface standards that support the second app at a communication timing set for the second app by way of a first app that is an app as middleware between the OS and the second app.

* * * * *